(12) United States Patent
Kwolek

(10) Patent No.: US 7,992,915 B2
(45) Date of Patent: Aug. 9, 2011

(54) VEHICLE INTERIOR ASSEMBLY

(75) Inventor: Chad Kwolek, Hartland, MI (US)

(73) Assignee: Nissan North America, Inc., Franklin, TN (US)

( * ) Notice: Subject to any disclaimer, the term of this patent is extended or adjusted under 35 U.S.C. 154(b) by 295 days.

(21) Appl. No.: 12/395,163

(22) Filed: Feb. 27, 2009

(65) Prior Publication Data
US 2010/0219653 A1    Sep. 2, 2010

(51) Int. Cl.
*B62D 25/14* (2006.01)
(52) U.S. Cl. .............. 296/70; 296/72; 296/1.08; 180/90
(58) Field of Classification Search .................. 296/70, 296/72, 1.08; 180/90
See application file for complete search history.

(56) References Cited

U.S. PATENT DOCUMENTS

| | | | |
|---|---|---|---|
| 4,887,861 A | 12/1989 | Moch et al. | |
| 5,005,898 A * | 4/1991 | Benedetto et al. | 296/70 |
| 5,673,964 A * | 10/1997 | Roan et al. | 296/70 |
| 5,707,100 A * | 1/1998 | Suyama et al. | 296/70 |
| 6,196,588 B1 * | 3/2001 | Sugawara | 180/90 |
| 6,213,504 B1 * | 4/2001 | Isano et al. | 296/70 |
| 2007/0262854 A1 * | 11/2007 | Colburn et al. | 296/70 |
| 2009/0261613 A1 * | 10/2009 | Johnson et al. | 296/72 |

FOREIGN PATENT DOCUMENTS

JP    S58-194641 A    11/1983

* cited by examiner

*Primary Examiner* — Lori Lyjak
(74) *Attorney, Agent, or Firm* — Global IP Counselors, LLP

(57) ABSTRACT

A vehicle interior assembly that includes a first component and a second component fixedly installed within the vehicle interior assembly at spaced apart locations. A trim panel is fixedly attached to the first component in a fixed positional orientation relative to the first component and is attached to the second component in a predetermined range of orientations in order to compensate for minor alignment variations resulting from the manufacturing and assembly tolerances of the first and second components.

20 Claims, 13 Drawing Sheets

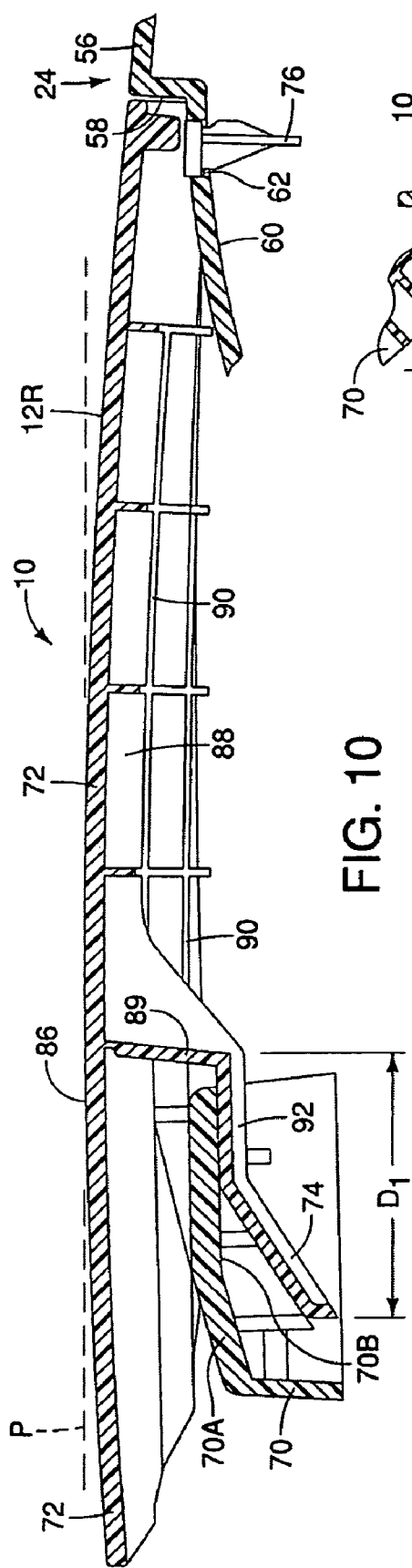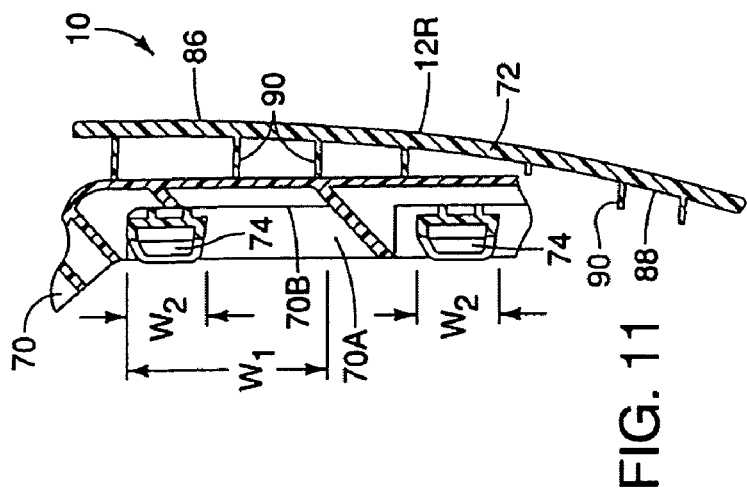
FIG. 10
FIG. 11

VEHICLE INTERIOR ASSEMBLY

BACKGROUND OF THE INVENTION

1. Field of the Invention

The present invention relates to a vehicle interior assembly. More specifically, the present invention relates to a trim panel that attaches to two separate components of a vehicle interior assembly and includes an attachment section attached to one of the components that compensates for alignment variations between the two separate components.

2. Background Information

Conventional vehicle interior assemblies, such as dashboard assemblies, include many components that ideally attach to one another with specific positional orientations with respect to one another. For example, a conventional vehicle interior assembly is preferably mounted to a structural element within a vehicle passenger compartment. The structural element typically includes a support bracket that is rigidly fixed to the frame of the vehicle. An instrument panel assembly is installed to the support bracket. Typically, components such as an air conditioning evaporator housing, a heater core housing and/or ventilation ducts, are also fixed to the large bracket and/or to one another and are concealed by the instrument panel assembly. Such components are hereinafter referred to as concealed components.

A lower end portion of the vehicle interior assembly is at least partially covered with one or more trim panels to protect and further conceal the concealed components. In order to provide an attractive appearance, each of the trim panels is dimensioned to align and/or mate with various exposed portions of the vehicle interior assembly. In many designs, the trim panel typically must attach to the instrument panel assembly and/or a center console, and one of the concealed components.

In the manufacturing process of the concealed components and the exposed components of the instrument panel assembly, there are manufacturing tolerances and in the assembly process there are assembling tolerances. Specifically, during the manufacturing process, there are slight variations in the various components due to a number of factors, depending upon the manufacturing process. For example, components made of molded plastic, molded resin based materials or molded polymer based materials, factors such as the curing process, drying process, atmospheric conditions and condition of the molds used, all have an effect on the molded component. One such effect is that the overall dimensions of the component may differ slightly from component to component. This effect is usually referred to as a manufacturing tolerance. However, as long as the dimensions of the component are with a predetermined range of tolerances, the component can be used. When several components are assembled together, their respective tolerances are compounded.

During assembly of a plurality of components, further variations in the relative positioning of one component to another can also vary. For example, where a first component and a second components are fastened together, if the fastening apertures are larger that the fasteners, then the relative position and orientation of the second component relative to the first component can vary slightly yielding assembly tolerances.

The combination of manufacturing tolerances and assembly tolerances creates a problem when one attachment section of the trim panel is attached to a first component of a vehicle interior assembly and another attachment section of the trim panel is attached to a second component of the vehicle interior assembly. Specifically, if the first attachment section is rigidly fixed to the first component, the second attachment section might not align with the second component. In other words, the relative positions and orientations of the first and second components can vary from vehicle to vehicle. The trim panel may not fit properly in one vehicle, but may fit perfectly in another vehicle due to variations resulting from both manufacturing tolerances and assembly tolerances.

In view of the above, it will be apparent to those skilled in the art from this disclosure that there exists a need for an improved trim panel attachment arrangement that takes both manufacturing tolerances and assembly tolerances into consideration. This invention addresses this need in the art as well as other needs, which will become apparent to those skilled in the art from this disclosure.

SUMMARY OF THE INVENTION

One object of the present invention is to provide a trim panel with positioning flexibility with respect to attachment to a fixed component.

Another object of the present invention is provide a trim panel with two separate attachment sections where a first attachment section attaches to a first component in a fixed positional orientation and a second attachment section that attaches to a second component but provides positional compensation that allows for manufacturing and assembly tolerances.

In accordance with one aspect of the present invention, a vehicle interior assembly includes a support member, a first component, a second component and a trim panel. The support member is located within a vehicle interior and has a first attachment section and a second attachment section spaced apart from the first attachment section. The first component is fixedly coupled to the first attachment section of the support member in a predetermined orientation relative to the support member within a first set of prescribed tolerances. The first component also has a third attachment section spaced apart from the first attachment section. The second component is fixedly coupled to the second attachment section of the support member in a predetermined orientation relative to the support member within a second set of prescribed tolerances. The second component also has a fourth attachment section spaced apart from the second attachment section and the third attachment section. The trim panel has a fifth attachment section and a sixth attachment section spaced apart from one another. The fifth attachment section is configured to fixedly attached to the third attachment section of the first component in a fixed positional orientation relative to the first component. The sixth attachment section is configured to attach to the fourth attachment part of the second component in a predetermined range of orientations in order to compensate for minor alignment variations resulting from the first and second set of tolerances.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 10 is a cross-sectional view of one of the L-shaped brackets and one of the trim panels, taken along the line 10-10 in FIG. 9, showing a hooking member clamped to the one of the L-shaped brackets and snap-fit tabs of the trim panel, in accordance with the present invention;

FIG. 11 is another cross-sectional view of one of the L-shaped brackets and one of the trim panels, taken along the line 11-11 in FIG. 9, showing the hooking members clamped to the one of the L-shaped brackets in accordance with the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
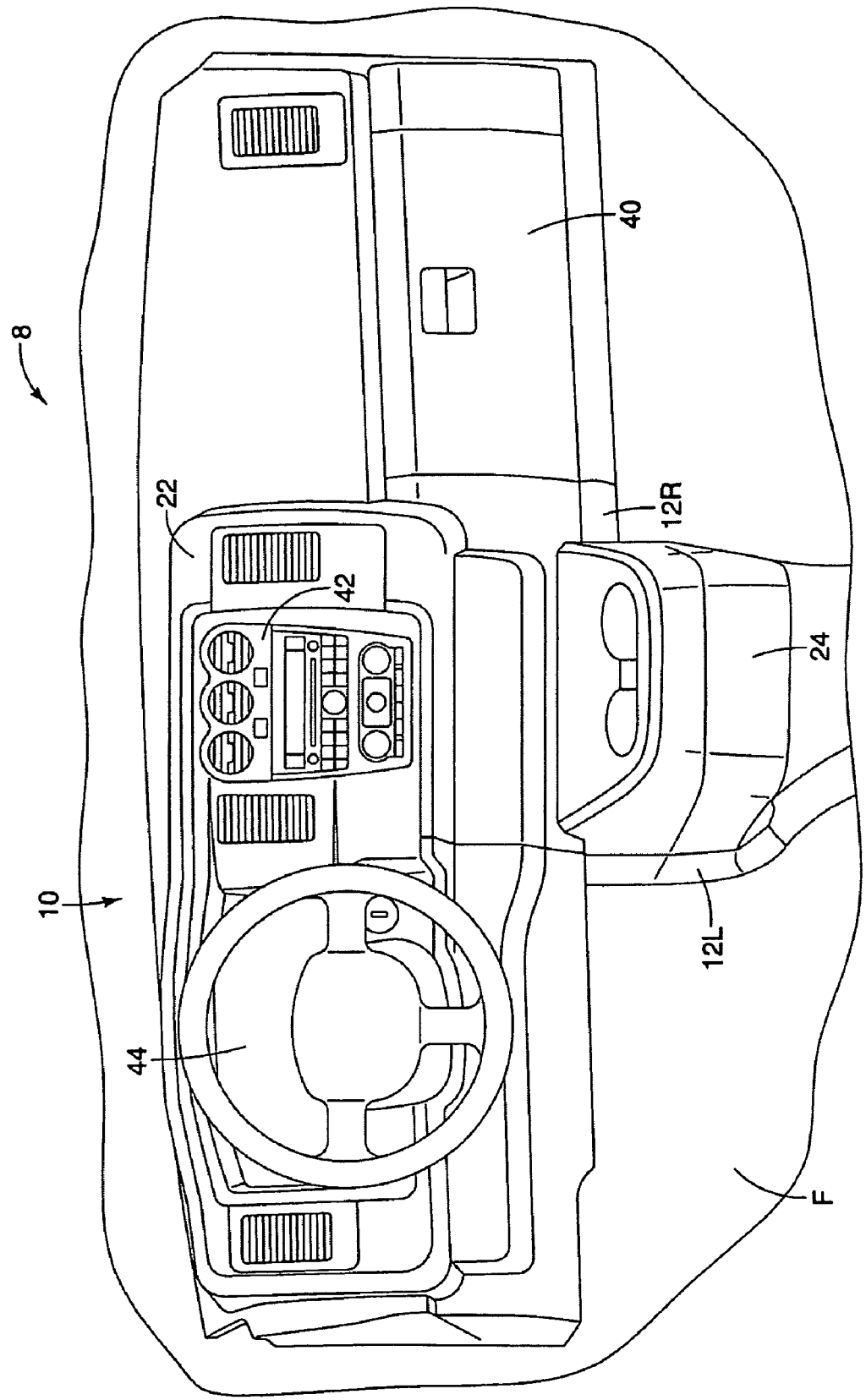
FIG. 1 is an elevational view of a passenger compartment of a vehicle showing a vehicle interior assembly that includes trim panels in accordance with the present invention.
Figure 2:
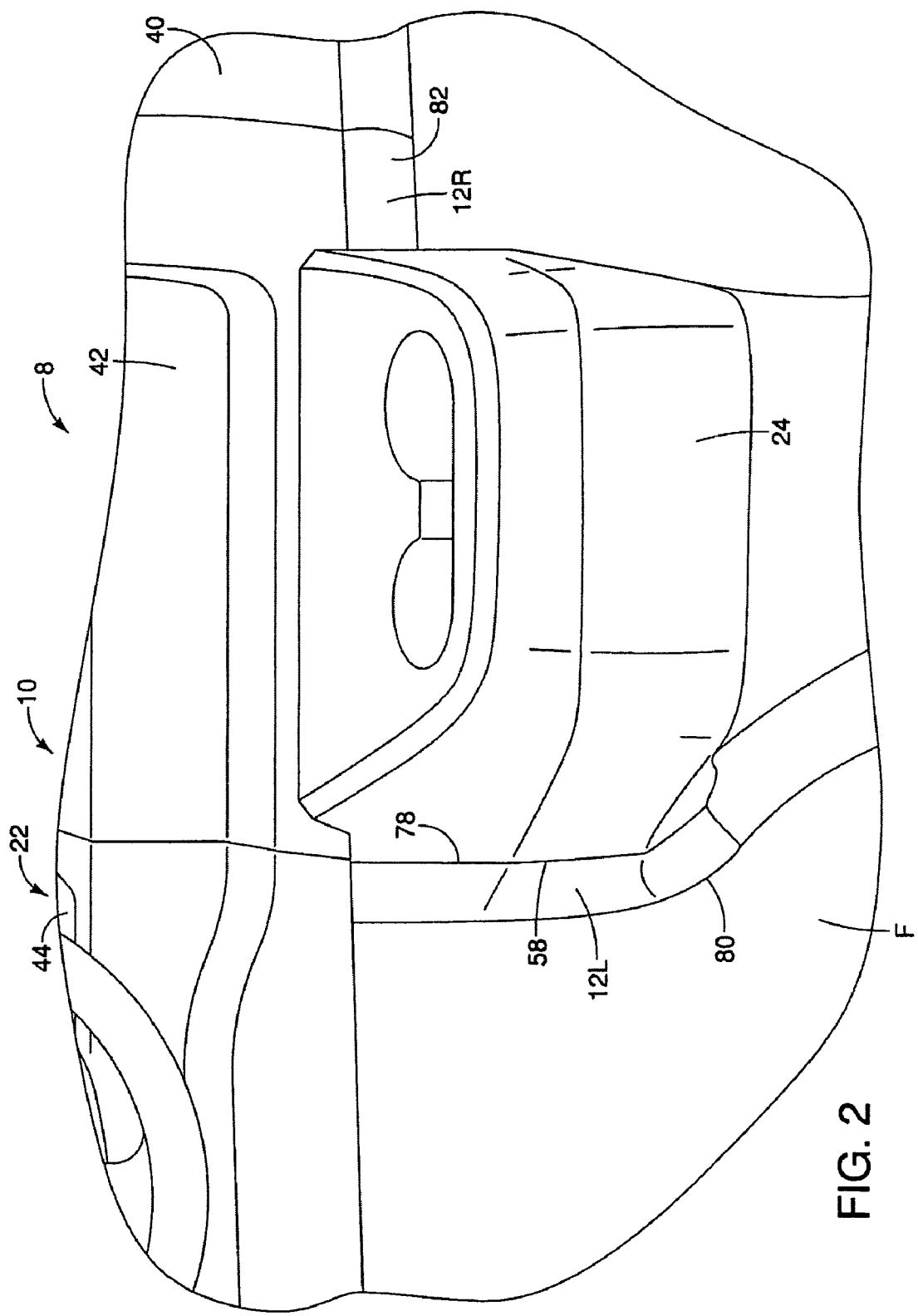
FIG. 2 is a close-up perspective view of a lower region of the vehicle interior assembly showing one of the trim panels, an instrument panel assembly and a center console assembly in accordance with the present invention.

Referring initially to FIG. 1, a vehicle interior assembly 10 of a passenger compartment 8 of a vehicle is illustrated in accordance with a first embodiment of the present invention. The vehicle interior assembly 10 includes trim panels 12L and 12R that are each configured to attach to two different and separate components of the vehicle interior assembly 10. The trim panels 12L and 12R each include an attachment configuration that is dimensioned to attach to one of the components in a fixed relationship but attach to another component with compensation for alignment variations between the separate components due to manufacturing and assembly tolerances, as described in greater detail below.

As best shown in FIGS. 1-5, the vehicle interior assembly 10 basically includes a plurality of components, such as a support assembly 20 (FIGS. 5 and 14), an instrument panel assembly 22, a center console assembly 24, a heater core housing 26 (FIGS. 4, 5 and 14), an AC evaporator housing 28 (FIGS. 4, 5 and 14) and the trim panels 12L (FIGS. 1, 2, 6-8 and 14) and 12R (FIGS. 1-14).

Figure 5:
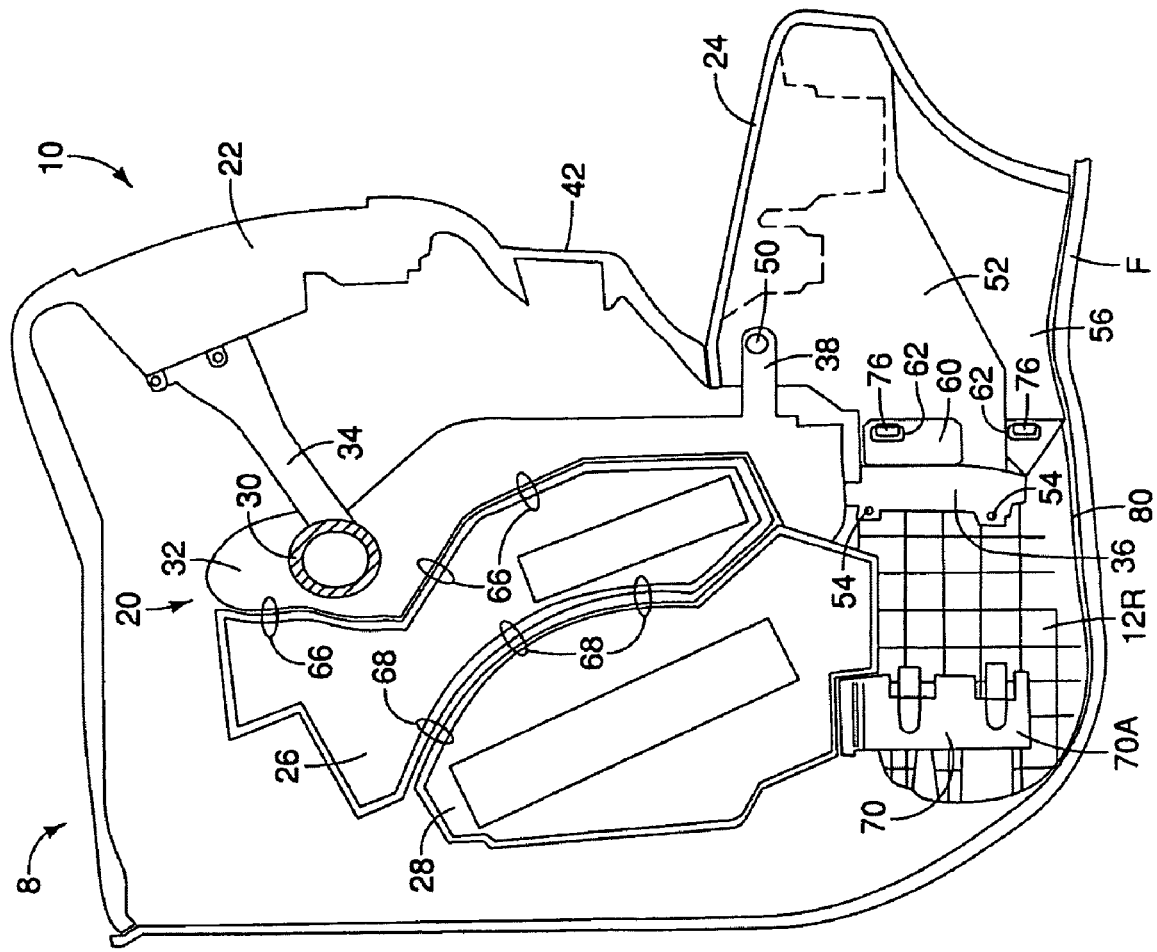
FIG. 5 is a cross-sectional side view of the vehicle interior assembly taken along the line 5-5 in FIG. 4, showing attachment sections of one of the trim panels, the instrument panel assembly, the center console assembly, the heater core housing, the AC evaporator housing and L-shaped brackets extending down from a lower end of the AC evaporator housing, in accordance with the present invention.
Figure 14:
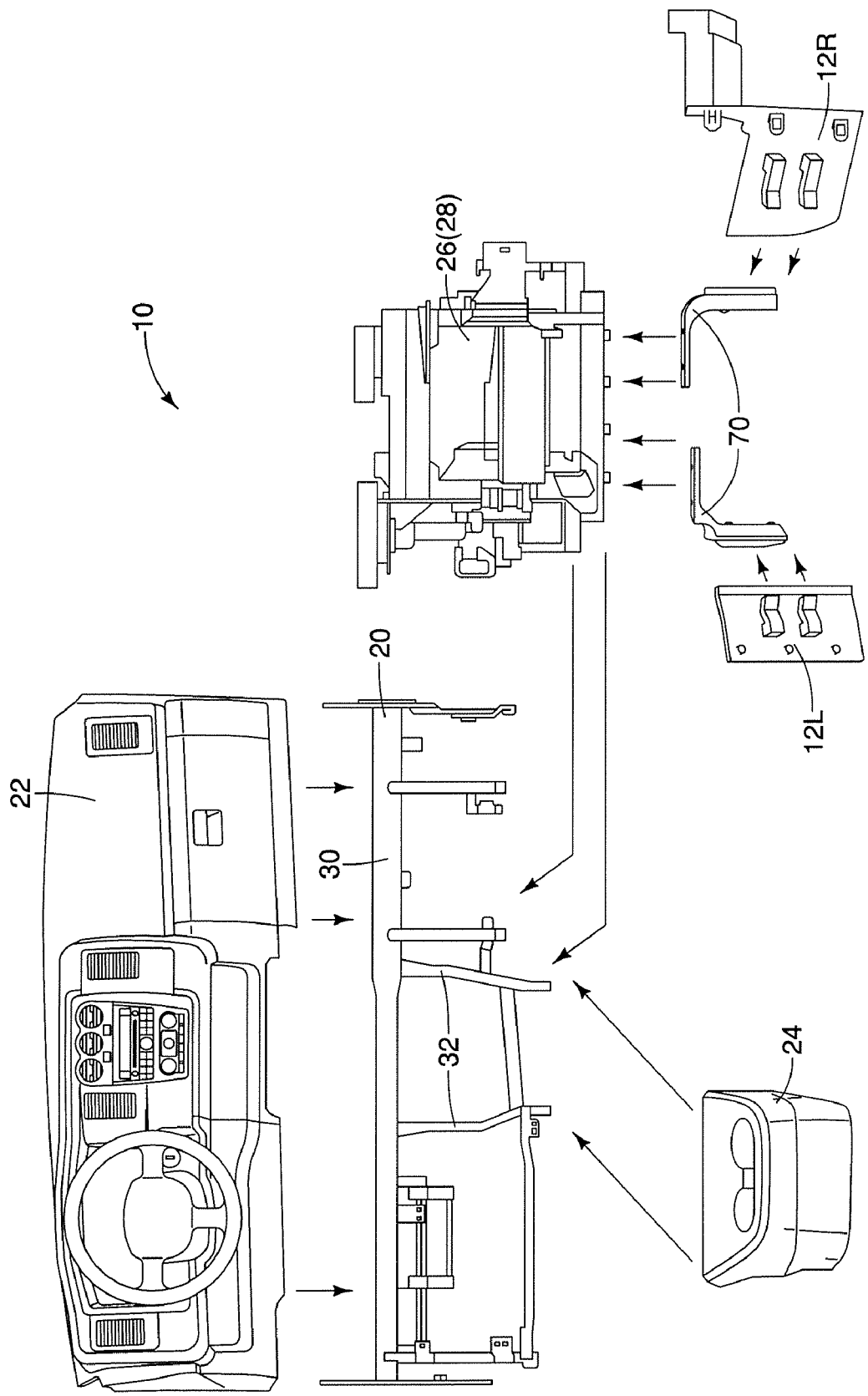
FIG. 14 is an exploded view of the vehicle interior assembly showing the support assembly, the instrument panel assembly, the center console, the heater core housing with the AC evaporator housing, the L-shaped brackets and the trim panels in accordance with the present invention.

As indicated in FIG. 5, the support assembly 20 is a conventional vehicle component disposed within the passenger compartment 8 of the vehicle that supports at least a portion, if not all the components of the vehicle interior assembly 10. The support assembly 20 includes a steering member 30, a main bracket 32, an upper bracket 34, an extension bracket 36 and a rear lower bracket 38. The steering member 30 is preferably a part of the vehicle structure and extends laterally side-to-side through the passenger compartment 8, as indicated in FIG. 14. Since the steering member 30 is a conventional element well known in the art, further description of the steering member 30 is omitted for the sake of brevity.

As shown in FIG. 14 and indicated in FIG. 5, the main brackets 32 are rigidly fixed to the steering member 30. The main brackets 32 are elongated extending downward from the steering member 30. The upper bracket 34 (best shown in FIG. 5) extends rearward from the steering member 30 and is configured to support the instrument panel assembly 22. Hence, the upper bracket 34 is a dashboard support bracket.

Figure 6:
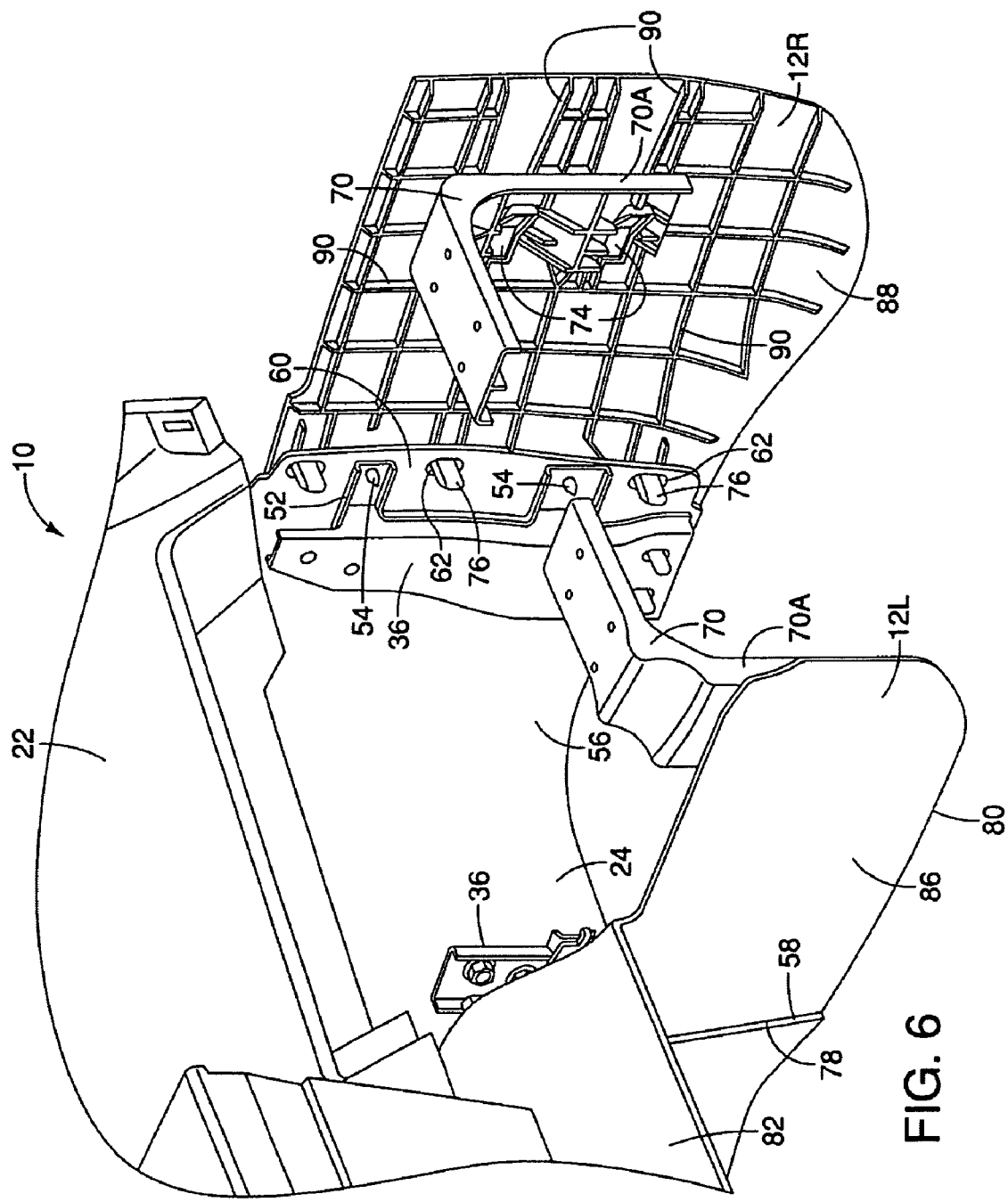
FIG. 6 is a perspective view of the vehicle interior assembly with the heater core housing and the AC evaporator housing removed, looking from the area of an engine compartment rearward showing the L-shaped brackets removed from the AC evaporator housing, the trim panels and the center console in accordance with the present invention.
Figure 7:
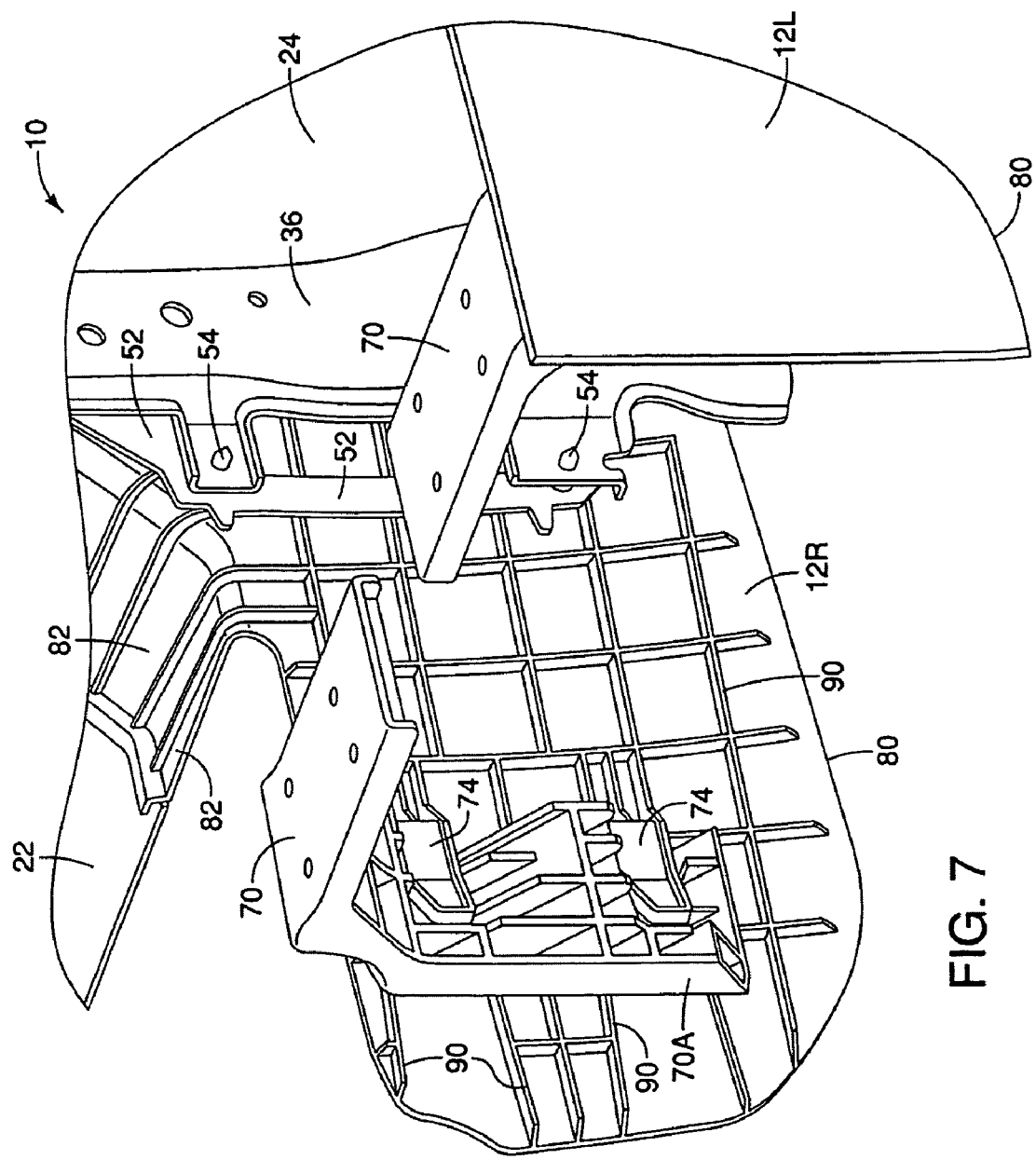
FIG. 7 is another perspective view of the vehicle interior assembly with the heater core housing and the AC evaporator housing removed, looking from the area of an engine compartment rearward from an angle different from FIG. 6, showing the L-shaped brackets, the trim panels and the center console in accordance with the present invention.
Figure 8:
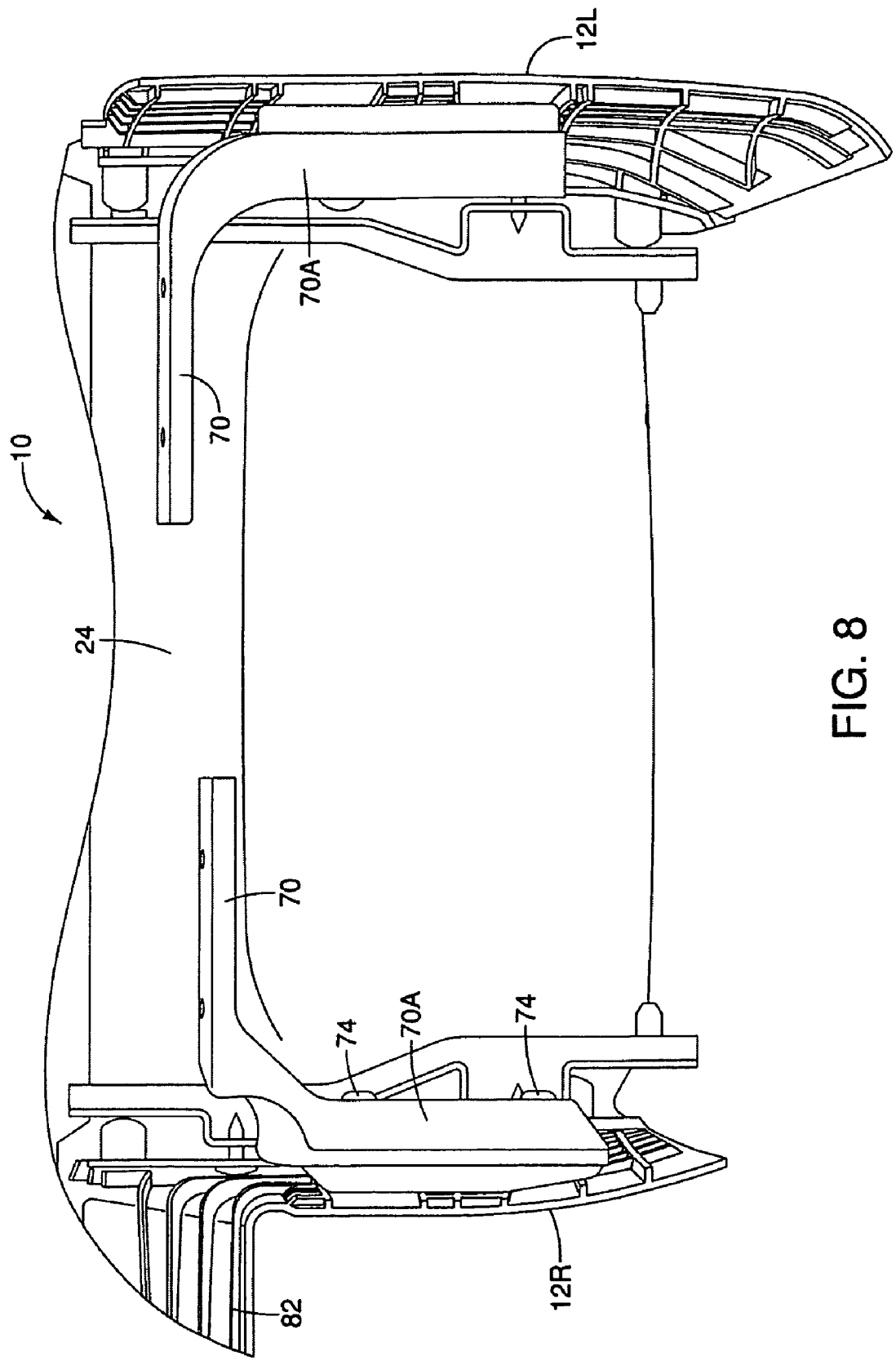
FIG. 8 is a plan view of the vehicle interior assembly with the heater core housing and the AC evaporator housing removed, looking from the area of an engine compartment rearward, showing the L-shaped brackets, the trim panels and the center console in accordance with the present invention.
Figure 9:
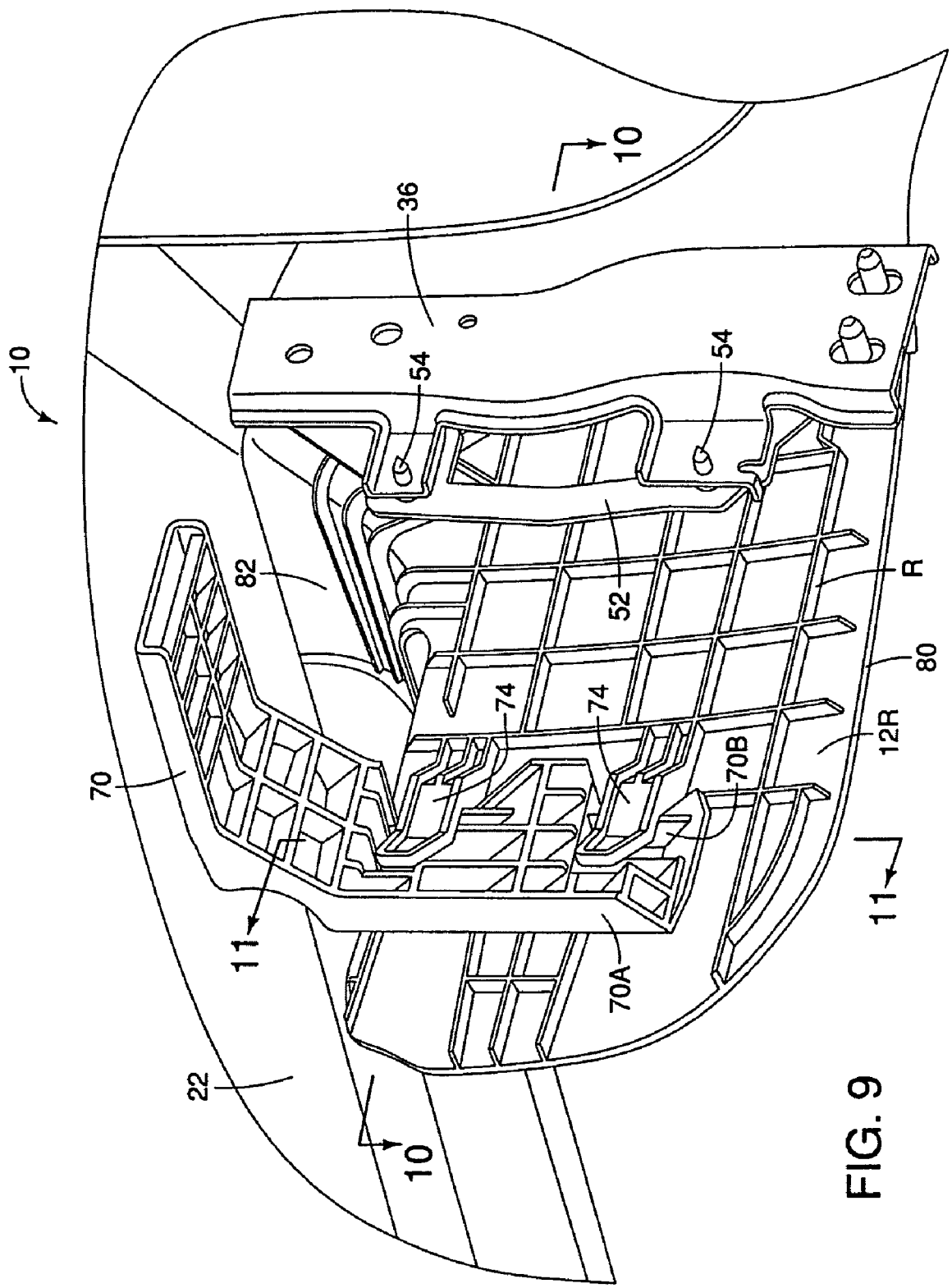
FIG. 9 is another perspective view of the vehicle interior assembly, looking upward from beneath the vehicle, showing one of the L-shaped brackets and the trim panel in accordance with the present invention.

The extension brackets 36 are separate bracket members that extend downward from a lower end of the main bracket 32 and are fixed by fasteners to a lower end of the main bracket 32. The extension brackets 36 are indicated in FIG. 5, but are best shown in FIGS. 6, 7 and 9. Although not shown, a lower end of each of the extension brackets 36 can also be attached to a floor F of the passenger compartment. The extension brackets 36 are configured to support a front end of the center console assembly 24, as described in greater detail below. The rear lower bracket 38 extends rearward from the lower end of the main bracket 32 and is configured to attach to a front portion of the center console assembly 24 and a lower end of the instrument panel assembly 22.

The main bracket 32, the upper bracket 34 and the rear lower bracket 38 are all rigidly fixed to the steering member 30 and are also conventional vehicle elements. The main bracket 32, the upper bracket 34, the front lower bracket 36 and the rear lower bracket 38 are dimensioned to support the various components of the vehicle interior assembly 10, as described in greater detail below. It should be understood from the drawings and description herein that the steering member 30 includes a plurality of brackets, including two of the main brackets 32, several of the upper brackets 34, two of the extension brackets 36 and several of the rear lower brackets 38. However for the sake of brevity, only one of each of the brackets is depicted in FIG. 5.

The rear lower bracket(s) 38 of the support assembly 20 basically define a first attachment section of the support assembly 20. The upper bracket(s) 34 of the support assembly 20 basically define a second attachment section of the support assembly 20.

As best shown in FIGS. 1-3 and 14, the instrument panel assembly 22 includes a plurality of sections, such as a storage compartment section 40, an HVAC control section 42 and a display section 44. Since these sections of the instrument panel assembly 22 are conventional, description of them is omitted for the sake of brevity. As best shown in FIG. 5, a concealed front surface of the instrument panel assembly 22 is fixedly attached in a conventional manner to the upper bracket 34 of the support assembly 20. For example, the instrument panel assembly 22 can be attached to the upper bracket 34 via fasteners (not shown). As mentioned above, there is a plurality of upper brackets 34 (only one is depicted). The instrument panel assembly 22 is attached to each of the upper brackets 34. A lower end of the instrument panel assembly 22 is also preferably connected to the rear lower bracket 38 of the support assembly 20 at attachment point 50. Although not shown, it should be understood from the drawings and the description herein that the instrument panel assembly 22 can also be attached to adjacent surfaces of the passenger compartment 8 in a conventional manner.

As shown in FIGS. 1-4, the center console assembly 24 is disposed below the HVAC control section 32 of the instrument panel assembly 22. As best shown in FIG. 5, the center console assembly 24 includes a pair of symmetrical concealed brackets 52 (only one is shown in FIG. 5). The brackets 52 are either fixed to or molded into an interior portion of the center console assembly 24 in a conventional manner. The center console assembly 24 rests on a floor F of the passenger compartment 8 and is fixed at attachment part 50 in a conventional manner to the to the rear lower bracket 38. Further, the brackets 52 of the center console assembly 24 are fixed to the extension bracket 34 at attachment points 54.

As best shown in FIGS. 2-4 and 10, the center console assembly 24 also includes side walls 56, each having a mating portion 58 and an attachment section 60. The mating portions 58 are basically shoulders formed by offset portions of the side wall 56 that provide a surface that aligns with a corresponding edge of the trim panels 12L and 12R, described further below. The attachment sections 60 include a plurality of apertures 62 that are provided for attachment of the trim panels 12L and 12R, as described further below.

The center console assembly 24 is a first component of the vehicle interior assembly 10 that fixedly coupled to the first attachment section of the support assembly 20 (a support member) in a predetermined orientation relative to the support assembly 20 within a first set of prescribed tolerances. The first set of prescribed tolerances includes manufacturing tolerances and assembly tolerances of the support assembly 20 and the center console assembly 24.

The heater core housing 26 (FIGS. 4, 5 and 14) is a conventional component that includes a heater coil or heater core that provides heat to the passenger compartment 8 in a conventional manner. As shown in FIG. 5, the heater core housing 26 is fixed to the main bracket 32 of the support assembly 20 in a conventional manner. For example, the heater core housing 26 can be fixed to the main bracket 32 of the support assembly 20 by fasteners (not shown) at attachment sections 66. Since the heater core housing 26 is a conventional component, further description is omitted for the sake of brevity.

Figure 4:
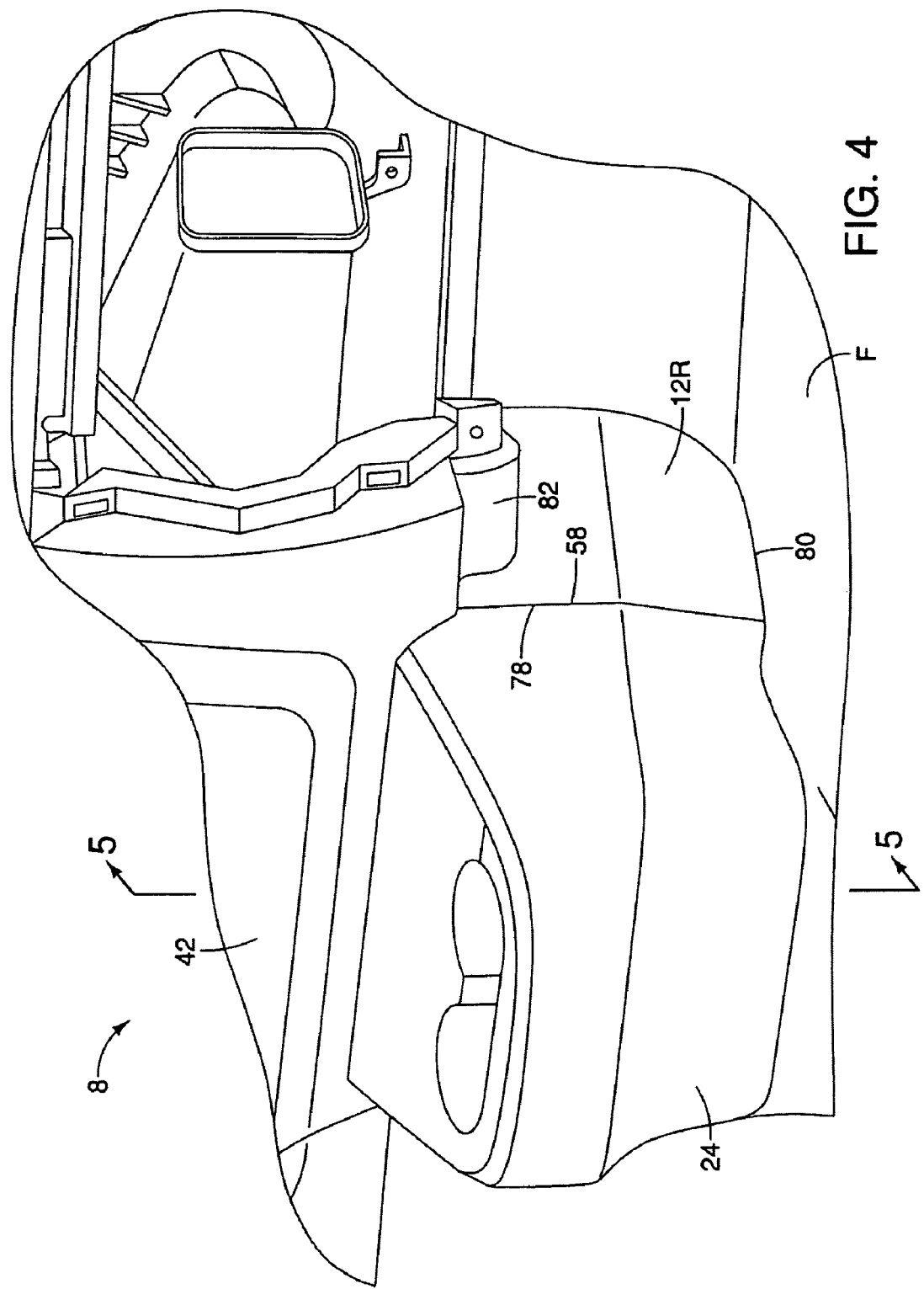
FIG. 4 is another close-up perspective view of the lower region of the vehicle interior assembly similar to FIG. 3, but with the storage compartment section removed to reveal a portion of a heater core housing and an AC evaporator housing in accordance with the present invention.

As best shown in FIGS. 4 and 5, the AC evaporator housing 28 is a conventional component at least partially concealed behind the instrument panel assembly 22 and the heater core housing 26. As shown in FIG. 5, the AC evaporator housing 28 is fixed to the heater core housing 26 in a conventional manner. For example, AC evaporator housing 28 and the heater core housing 26 can be formed together as a single monolithic structure or can be fixed to one another via fasteners (not shown) at attachment sections 68. A bottom surface of the AC evaporator housing 28 is provided with a pair of L-shaped brackets 70. The L-shaped brackets 70 are attached via fasteners (not shown) to the AC evaporator housing 28 but can alternatively be unitarily formed with the AC evaporator housing 28. The L-shaped brackets 70 are preferably made of metal and define an attachment section of the AC evaporator housing 28 and the heater core housing 26.

Figure 12:
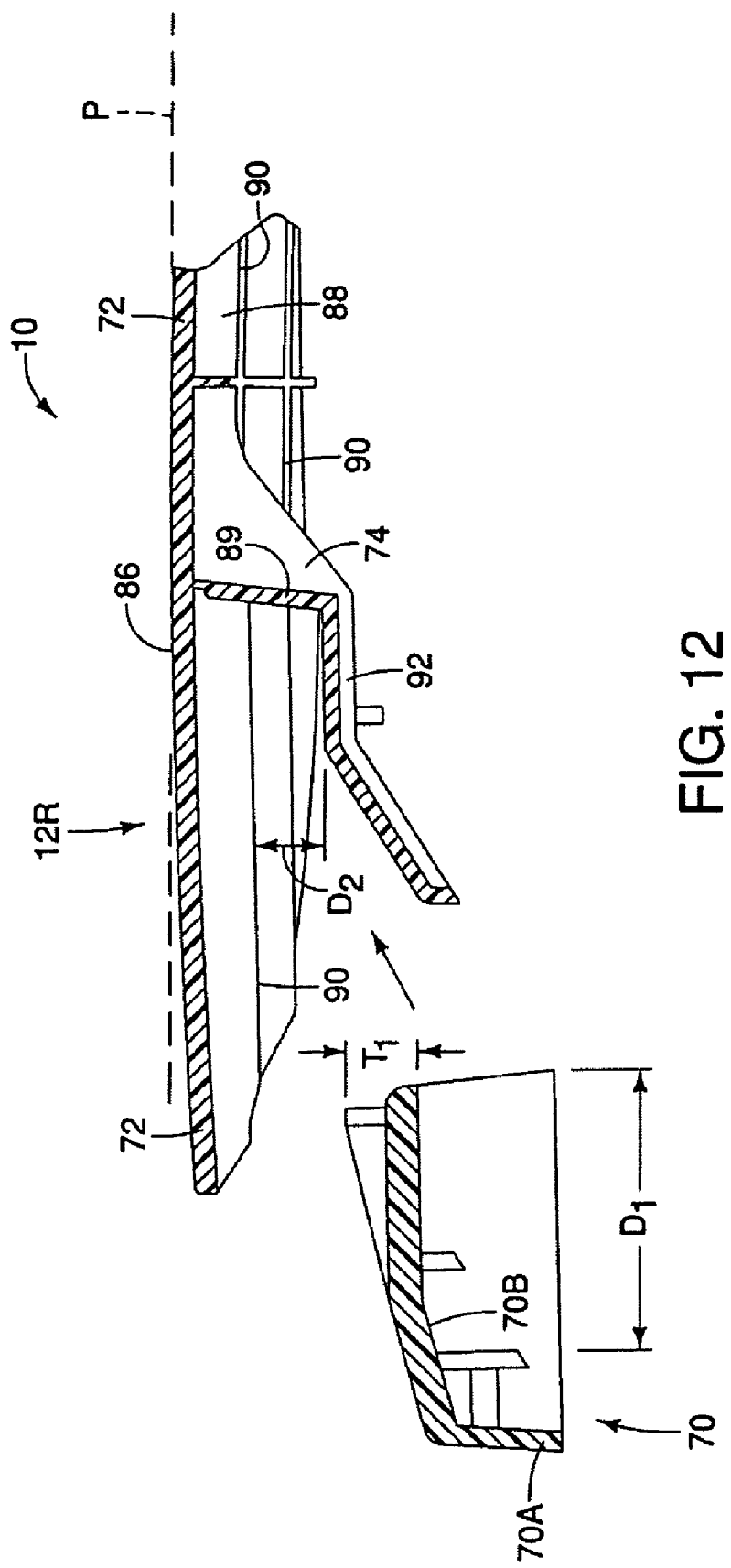
FIG. 12 is an exploded cross-sectional view similar to FIG. 10, showing the trim panel in an uninstalled state relative to the L-shaped brackets in accordance with the present invention.
Figure 13:
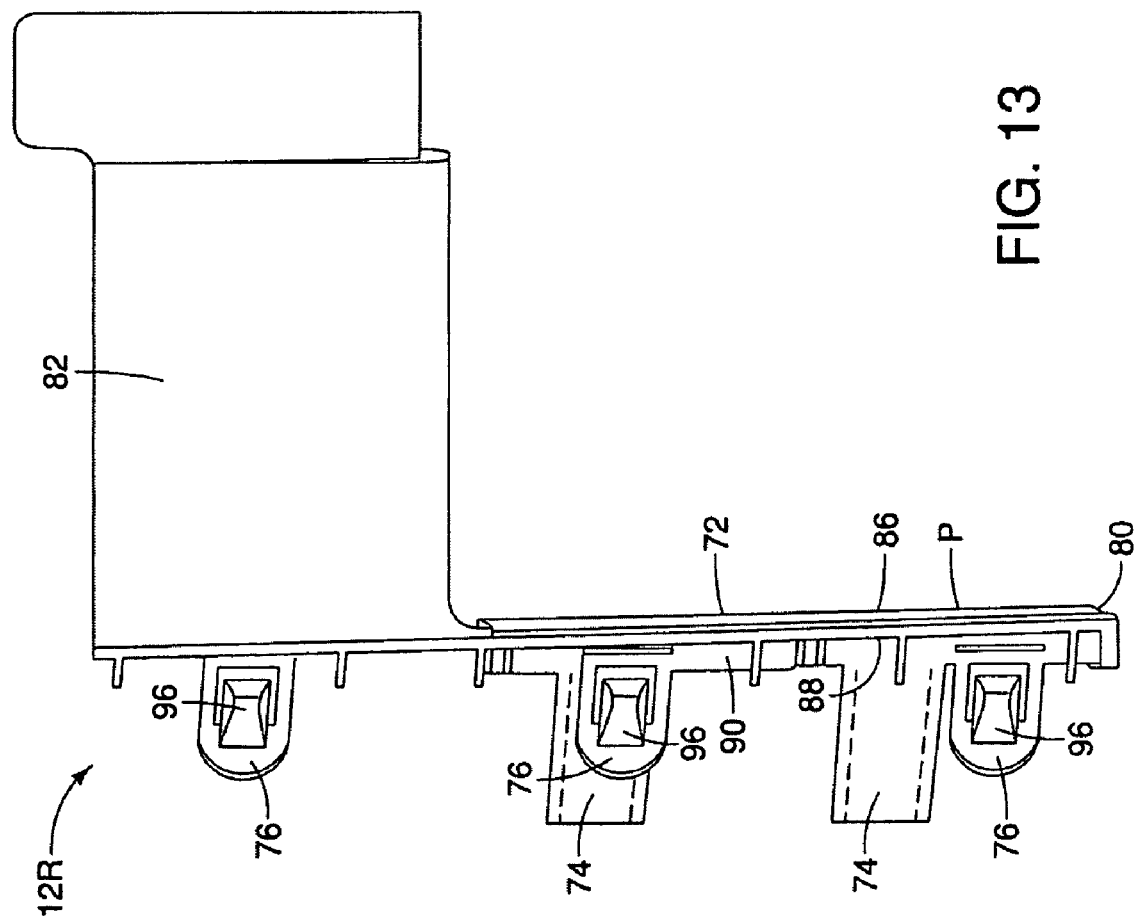
FIG. 13 is a front elevational view of one of the trim panels removed from the vehicle interior assembly, showing the snap-fit tabs in accordance with the present invention.

Each of the L-shaped brackets 70 includes a downwardly extending section 70A. Each downwardly extending section 70A includes a pair of recesses 70B shown in FIGS. 5, 6, 7, 9-12 and 14. However, as best shown in FIGS. 11 and 12, the recesses 70B have a width $W_1$. As shown in FIG. 12, at the recesses 70B, the L-shaped bracket 70 has a thickness $T_1$ and a depth $D_1$, as shown in FIG. 12.

For the purposes of understanding the invention, the AC evaporator housing 28 and the heater core housing 26 can be considered as a single component of the vehicle interior assembly 10, as indicated in FIG. 14. However, the AC evaporator housing 28 and the heater core housing 26 can also be considered as two separate components of the vehicle interior assembly 10. For instance, in the depicted embodiment, both the AC evaporator housing 28 and the heater core housing 26 are included in the vehicle interior assembly 10. However, in an alternative embodiment, the AC evaporator housing 28 can be omitted with the L-shaped brackets 70 attached to a lower end of the heater core housing 26. In yet another alternative embodiment, the AC evaporator housing 28 and the heater core housing 26 can be combined into a single unitary housing and be considered as a single component.

Hence, one or both of the AC evaporator housing 28 and the heater core housing 26 can be considered as a second component that is fixedly coupled to the second attachment section of the support assembly 20 (a support member) in a predetermined orientation relative to the support assembly 20 within a second set of prescribed tolerances. The second set of prescribed tolerances includes manufacturing tolerances and assembly tolerances of the support assembly 20, the AC evaporator housing 28 and the heater core housing 26.

A description is now provided for the trim panels 12L and 12R is now provided with specific reference to FIGS. 4-13. The trim panels 12L and 12R have essentially the same features, but are dimensioned differently from one another. Those features that are common to both of the trim panels 12L and 12R are given the same reference numerals.

The trim panels 12R and 12L are preferably made of a molded polymer or plastic material, but can alternatively be made of an alternative backing material with a trim or facia material covering the backing material. The trim panels 12R and 12L are preferably made of a material that has some flexibility and resiliency.

Both of the panels 12L and 12R include a main body portion 72, hook members 74, snap-fit tabs 76, a mating edge 78 and a floor edge 80, whose features are described in detail below. Hence, description of the main body portion 72, the hook members 74, the snap-fit tabs 76, the mating edge 78 and the floor edge 80 applies equally to the panels 12L and 12R. However, the panel 12R includes a projecting panel portion 82, whereas, the panel 12L does not include a projecting panel portion. It should be appreciated from the drawings that the overall dimensions of the panel 12L differs from the overall dimensions of the panel 12R. However, it should be understood from the drawings and the description herein that basic purposes and functions of the main body portion 72, the hook members 74, the snap-fit tabs 76, the mating edge 78 and the floor edge 80 are not affected by dimensional variations.

Figure 3:
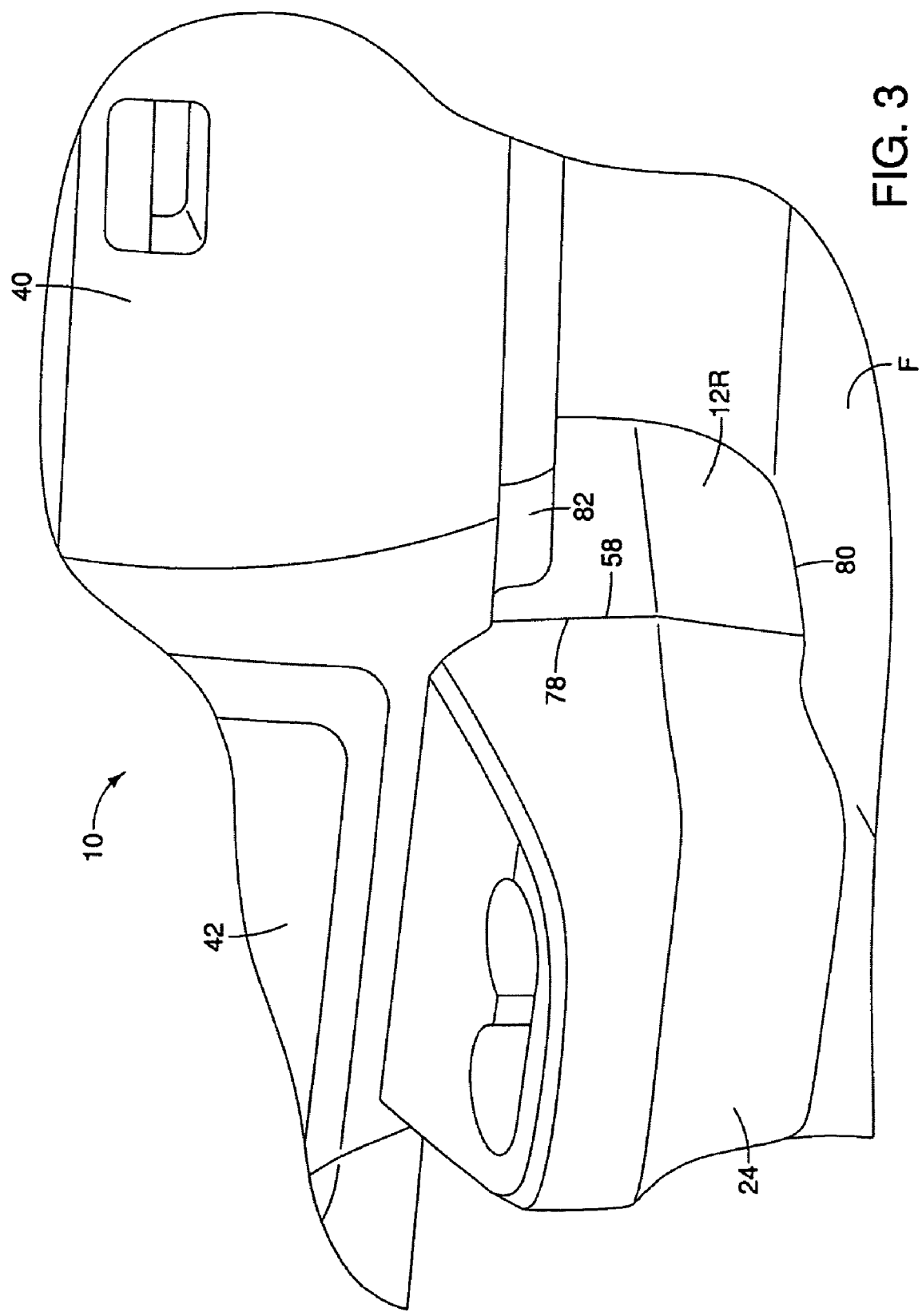
FIG. 3 is another close-up perspective view of the lower region of the vehicle interior assembly from an angle different that FIG. 2, showing the other of the trim panels, the instrument panel assembly, the center console assembly and a storage compartment section in accordance with the present invention.

As best shown in FIGS. 3, 4 and 6-9, the projecting panel portion 82 of the panel 12R is unitarily formed with the panel 12R and extends under a portion of the storage compartment section 40 of the instrument panel assembly 22. The projecting panel portion 82 includes an edge that mates with a lower edge of the storage compartment section 40 of the instrument panel assembly 22, as best shown in FIGS. 3 and 7.

As best shown in FIGS. 10 and 12, the main body portion 72 has an exposed trim surface 86 that defines a plane P and a back surface 88 that includes a plurality of stiffening ribs 89. The hook members 74 are formed integrally with the main body portion 72 and include an extension portion 90 and a projecting portion 92. The extension portions 90 extend from back surface 88 (a concealed surface) and the projecting portions 92 extend in a direction that is parallel to the plane P defined by the exposed trim surface 86. As shown in FIG. 12, in an uninstalled state, a distance $D_2$ is defined between the projection portions 92 and adjacent ones of the ribs 89. In the uninstalled state the distance $D_2$ between the projecting portions 92 (the projecting members) and the back surface 88 (the concealed surface) is smaller than the thickness $T_1$ of the L-shaped brackets 70 at the recesses 70B. As shown in FIG. 11, the hook members 74 have a width $W_2$ that is significantly smaller than the width $W_1$ of the recesses 70B.

As shown in FIGS. 6, 7 and 9-12, the hook members 74 are configured to clamp onto the L-shaped brackets 70 at the recesses 70B. Specifically, as indicated in FIG. 12, the hook members 74 can be moved toward the L-shaped brackets 70 thus hooking or clamping the hook members 74 around the L-shaped brackets 70 at the recesses 70B. An angled end of the hook members 74 provides an easy way to align the hook members 74 with the recesses 70B during installation. As shown in FIG. 10, flat surfaces inside the hook member 74 contacts the recess 70B biasing the trim panels 12R and 12L to the L-shaped brackets 70. Since the trim panels 12L and 12R are made of a resilient material, the hook members 74 flex thereby applying a slight clamping force to the L-shaped brackets 70. The depth $D_1$ and the width $W_1$ of recess 70B of the L-shaped bracket 70 relative to the width $W_2$ and overall length of the hook members 74 allow for significant flexibility with respect to the positioning of the trim panels 12L and 12R relative to the L-shaped brackets 70. Consequently, the positioning of the trim panels 12L and 12R relative to the heater core housing 26 and the AC evaporator housing 28 is flexible and provides positional compensation necessary to account for manufacturing and assembly tolerances.

Further, the hook members 74 of the trim panels 12L and 12R restrict the trim panels 12L and 12R against movement in directions perpendicular to the plane P.

A description of the snap-fit tabs 76 is now provided with specific reference to FIG. 14. The snap-fit tabs 76 project from the back surface 88 of the trim panels 12L and 12R adjacent to the mating edge 78. The snap-fit tabs 76 include projections 96 that are dimensioned to secure the trim panels 12L and 12R to the center console 24 when the snap-fit tabs 76 are inserted through the apertures 62, as indicated in FIGS. 5, 6 and 10. As best shown in 10, the snap-fit tabs 76 are spaced apart from the hook members 74.

The snap-fit tabs 76 basically define one attachment section on the trim panels 12L and 12R and the hook members 74 define another attachment section on the trim panels 12L and 12R. When the snap-fit tabs 76 are inserted into the apertures 62 of the center console 24, the trim panels 12L and 12R are in a fixed positional orientation relative to the center console 24 (a first component). However, the hook members 74 allow the trim panels 12L and 12R to attach to the L-shaped brackets 70, the AC evaporator housing 28 and the heater core housing 26 in a predetermined range of orientations in order to compensate for minor alignment variations resulting from the first and second set of tolerances.

The mating edges 78 of the trim panels 12L and 12R is shaped and dimensioned to align with the mating portions 58 of the center console 24. Further, the floor edge 80 is a lower edge of the trim panels 12L and 12R that are dimensioned to mate with an adjacent portion of the floor F.

A description of one method of assembling the vehicle interior assembly 10 is now provided with specific reference to FIG. 14. The view in FIG. 14 from within the passenger compartment looking toward the front of the vehicle. Therefore, the view of the support assembly 20 is a rear view. A front side of the support assembly 20 is not visible in FIG. 14. As indicated in FIG. 14, the support assembly 20 rigidly extends laterally between opposite side walls of the structural elements that define the passenger compartment. During vehicle assembly, the heater core housing 26 usually installed to a front side of the support assembly 20. Next, the AC evaporator housing 28 is installed to the heater core housing 26. However, it should be understood that the heater core housing 26 and the AC evaporator housing 28 can be installed to the support assembly 20 as a single component. Next, the L-shaped brackets 70 are attached to a lower end of the AC evaporator housing 28. However, it should be understood that the L-shaped brackets 70 can also be pre-installed on the AC evaporator housing 28 prior to installation of the AC evaporator housing 28.

Next, the instrument panel assembly 52 is installed to the support assembly 20. The instrument panel assembly 52 can be installed as a single unit, or in separate sections thereafter, the center console 24 is installed to the support assembly 20. Finally, the trim panels 12L and 12R are installed to respective ones of the L-shaped brackets 70, and the snap-fit connections of the trim panels 12L and 12R are attached to the center console 24.

The snap-fit connection between the center console 24 and the trim panels 12L and 12R is a firm, not move-able connection in that once installed, the trim panels 12L and 12R retain their respective positional orientation with respect to the center console 24. However, the connection between the hook members 74 and the L-shaped brackets allows for positional adjustments. In particular, manufacturing tolerances and assembly tolerances cause the L-shaped brackets 70 to be located at slightly different positions and orientations relative to the center console 24 from vehicle to vehicle. The attachment sections defined by the L-shaped brackets 70 and the hook members 74 allow for position and orientation flexibility, and still maintain a reliable connection therebetween.

The various portions of the passenger compartment 8 of the vehicle that were not described in detail above are conventional components that are well known in the art. Since such features are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle interior assembly comprising:
   a support member within a vehicle interior having a first attachment section, a second attachment section spaced apart from the first attachment section, and a dashboard support bracket;
   an instrument panel assembly removably attached to the dashboard support bracket;
   a first component fixedly coupled to the first attachment section of the support member in a predetermined orientation relative to the support member within a first set of prescribed tolerances, the first component having a third attachment section spaced apart from the first attachment section, the first component extending away from the instrument panel assembly;
   a second component fixedly coupled to the second attachment section of the support member in a predetermined orientation relative to the support member within a second set of prescribed tolerances, the second component having a fourth attachment section spaced apart from the second attachment section and the third attachment section, the second component being at least partially concealed by the instrument panel assembly with the instrument panel assembly attached to the dashboard support bracket;
   a trim panel having a fifth attachment section and a sixth attachment section spaced apart from one another, the fifth attachment section being configured to fixedly attached to the third attachment section of the first component in a fixed positional orientation relative to the first component, the sixth attachment section being configured to attach to the fourth attachment section of the second component in a predetermined range of orientations in order to compensate for minor alignment variations resulting from the first and second set of tolerances.

2. The vehicle interior assembly according to claim 1, wherein
   the trim panel has an exposed trim surface that defines a first plane and with the sixth attachment section attached to the fourth attachment section, the trim panel is restricted against movement in directions perpendicular to the plane.

3. The vehicle interior assembly according to claim 2, wherein
   the trim panel is restricted against movement in directions parallel to the plane with the fifth attachment section attached to the third attachment section.

4. The vehicle interior assembly according to claim 1, wherein
   the sixth attachment section of the trim panel includes at least one hook dimensioned to clamp on to the fourth attachment section.

5. The vehicle interior assembly according to claim 4, wherein
   the at least one hook includes a projecting member that extends parallel to a concealed surface of the trim panel such that in an uninstalled state a distance between the projecting member and the concealed surface is smaller than a thickness of the third attachment section.

6. The vehicle interior assembly according to claim 4, wherein
   the at least one hook includes a projecting member that extends in a direction that is angularly offset from a concealed surface of the trim panel.

7. The vehicle interior assembly according to claim 1, wherein
   the first component is a center console assembly rigidly fixed to the support member.

8. The vehicle interior assembly according to claim 7, wherein
   the second component includes an air conditioning evaporator coil assembly coupled to the support member that is at least partially concealed by the instrument panel assembly.

9. The vehicle interior assembly according to claim 7, wherein
   the second component includes a heater core assembly that is at least partially concealed by the instrument panel assembly.

10. The vehicle interior assembly according to claim 7, wherein
    the second component includes a heater core assembly having a first side fixedly attached to the second attachment section of the support member and a second side fixedly attached to an air conditioning evaporator coil assembly, the heater core assembly being at least partially concealed by the instrument panel assembly.

11. The vehicle interior assembly according to claim 1, wherein
the second component is an air conditioning/heating assembly coupled to the support member.

12. The vehicle interior assembly according to claim 1, wherein
the first component is a center console assembly installed to the first attachment section of the support member and the trim panel includes an edge adjacent to the fifth attachment section dimensioned to align with a mating portion of the center console assembly.

13. The vehicle interior assembly according to claim 1, wherein
the fifth attachment section comprises a plurality of snap-fitting tabs and the third attachment section of the first component comprises a corresponding plurality of mating tab receiving apertures.

14. The vehicle interior assembly according to claim 1, wherein
the support member is fixedly coupled within a vehicle passenger compartment.

15. The vehicle interior assembly according to claim 1, wherein
the fourth attachment section includes an L-shaped bracket fixed to a lower surface of the second component, and the sixth attachment section comprises a plurality of hook-shaped projections that extend in parallel to a concealed surface of the trim panel.

16. The vehicle interior assembly according to claim 15, wherein
the fifth attachment section comprises a plurality of snap-fitting tabs and the third attachment section of the first component comprises a corresponding plurality of mating tab receiving apertures.

17. The vehicle interior assembly according to claim 1, wherein
the trim panel includes a lower edge dimensioned to mate with a floor portion of a vehicle passenger compartment.

18. The vehicle interior assembly according to claim 16, wherein
the trim panel has an exposed trim surface that defines a first plane and with the sixth attachment section attached to the fourth attachment section, the trim panel is restricted against movement in directions perpendicular to the plane.

19. The vehicle interior assembly according to claim 18, wherein
the trim panel is restricted against movement in directions parallel to the plane with the fifth attachment section attached to the third attachment section.

20. The vehicle interior assembly according to claim 4, wherein
the at least one hook of the sixth attachment section of the trim panel is formed integrally with the trim panel.

* * * * *